United States Patent [19]
Ploger, III

[11] Patent Number: 5,537,607
[45] Date of Patent: Jul. 16, 1996

[54] FIELD PROGRAMMABLE GENERAL PURPOSE INTERFACE ADAPTER FOR CONNECTING PERIPHERAL DEVICES WITHIN A COMPUTER SYSTEM

[75] Inventor: Robert R. Ploger, III, Potomac, Md.

[73] Assignee: International Business Machines Corporation, Armonk, N.Y.

[21] Appl. No.: 408,455

[22] Filed: Mar. 22, 1995

Related U.S. Application Data

[63] Continuation of Ser. No. 55,054, Apr. 28, 1993, abandoned.

[51] Int. Cl.$^6$ ..................................................... G06F 13/10
[52] U.S. Cl. ..................... 395/830; 395/828; 364/239; 364/244.9; 364/238.2; 364/DIG. 1
[58] Field of Search ................................. 395/828, 853, 395/309, 250, 830, 886, 280, 823, 200.2, 200.16; 326/38, 39; 370/85.1

[56] References Cited

U.S. PATENT DOCUMENTS

| | | | |
|---|---|---|---|
| 3,714,635 | 1/1973 | Hamitton et al. | 395/775 |
| 3,828,325 | 8/1974 | Stafford et al. | 395/275 |
| 4,071,887 | 1/1978 | Daly et al. | 395/200 |
| 4,075,691 | 2/1978 | Davis et al. | 395/275 |
| 4,079,452 | 3/1978 | Larson et al. | 395/275 |
| 4,099,234 | 7/1978 | Woods et al. | 395/275 |
| 4,179,738 | 12/1979 | Fairchild et al. | 395/775 |
| 4,263,650 | 4/1981 | Bennett et al. | 395/275 |
| 4,322,793 | 3/1982 | Anderson et al. | 395/306 |
| 4,467,445 | 8/1984 | Mueller et al. | 395/200 |
| 4,509,113 | 4/1985 | Heath | 395/275 |
| 4,803,623 | 2/1989 | Klashka et al. | 395/275 |
| 4,807,183 | 2/1989 | Kung et al. | 395/325 |
| 4,807,282 | 2/1989 | Kazan et al. | 379/284 |
| 4,821,180 | 4/1989 | Gerety et al. | 395/275 |
| 4,884,228 | 11/1989 | Stanley et al. | 364/579 |
| 4,969,083 | 11/1990 | Gates | 364/147 |
| 4,991,085 | 2/1991 | Pleva et al. | 395/275 |
| 5,056,001 | 10/1991 | Sexton | 395/275 |
| 5,101,490 | 3/1992 | Getson, Jr. et al. | 395/425 |
| 5,109,503 | 4/1992 | Cruickshank et al. | 395/500 |
| 5,111,423 | 5/1992 | Kopec, Jr. et al. | 395/500 |
| 5,237,572 | 8/1993 | Badaoui et al. | 370/110.1 |
| 5,282,194 | 1/1994 | Harley, Jr. et al. | 370/17 |
| 5,426,379 | 6/1995 | Trimberger | 326/39 |
| 5,430,390 | 7/1995 | Chan et al. | 326/38 |

OTHER PUBLICATIONS

IBM TDB—Programmable Signal Loading Circuit by Curtis et al., vol. 33, No. 3A Aug. 1990.

Primary Examiner—Gopal C. Ray
Attorney, Agent, or Firm—John D. Flynn; Joseph C. Redmond, Jr.; Mark A. Wurm

[57] ABSTRACT

A peripheral circuit interface adapter for a computer system is defined whose function is established programmatically rather than being designed, laid out and fabricated uniquely for each different function the interface adapter might perform. A designer can program the interface adapter function and then cause that function to be defined dynamically through downloading on the interface adapter when the system on which it resides is powered on. The interface adapter contains rudimentary bus interface elements and external interface section and a control section. The control section establishes the overall function of the adapter and is defined by a field programmable gate array that assumes specific wiring characteristics as a result of downloading from the hosting system.

17 Claims, 8 Drawing Sheets

FIG. 3A

| Pin (+, -) | Connector J-1 | Connector J-2 |
|---|---|---|
| 1,2 | Data Bit 07 | Data Bit 23 |
| 3,4 | Data Bit 06 | Data Bit 22 |
| 5,6 | Ground | Ground |
| 7,8 | Data Bit 05 | Data Bit 21 |
| 9,10 | Data Bit 04 | Data Bit 20 |
| 11,12 | Data Bit 03 | Data Bit 19 |
| 13,14 | Data Bit 02 | Data Bit 18 |
| 15,16 | Ground | Ground |
| 17,18 | External Clock | External Status 2 |
| 19,20 | Data Bit 01 | Data Bit 17 |
| 21,22 | Data Bit 00 | Data Bit 16 |
| 23,24 | Flow Control | System Status 2 |
| 25,26 | Ground | Ground |
| 27,28 | System Status 1 | System Status 3 |
| 29,30 | Data Bit 15 | Data Bit 31 |
| 31,32 | Data Bit 14 | Data Bit 30 |
| 33,34 | Terminate | External Status 3 |
| 35,36 | Ground | Ground |
| 37,38 | Data Bit 13 | Data Bit 29 |
| 39,40 | Data Bit 12 | Data Bit 28 |
| 41,42 | Data Bit 11 | Data Bit 27 |
| 43,44 | Data Bit 10 | Data Bit 26 |
| 45,46 | Ground | Ground |
| 47,48 | Data Bit 09 | Data Bit 25 |
| 49,50 | Data Bit 08 | Data Bit 24 |

FIG. 3B

Data bit numbers in RS/6000 format

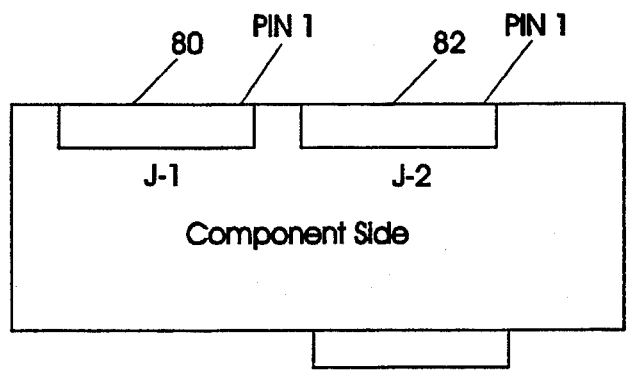

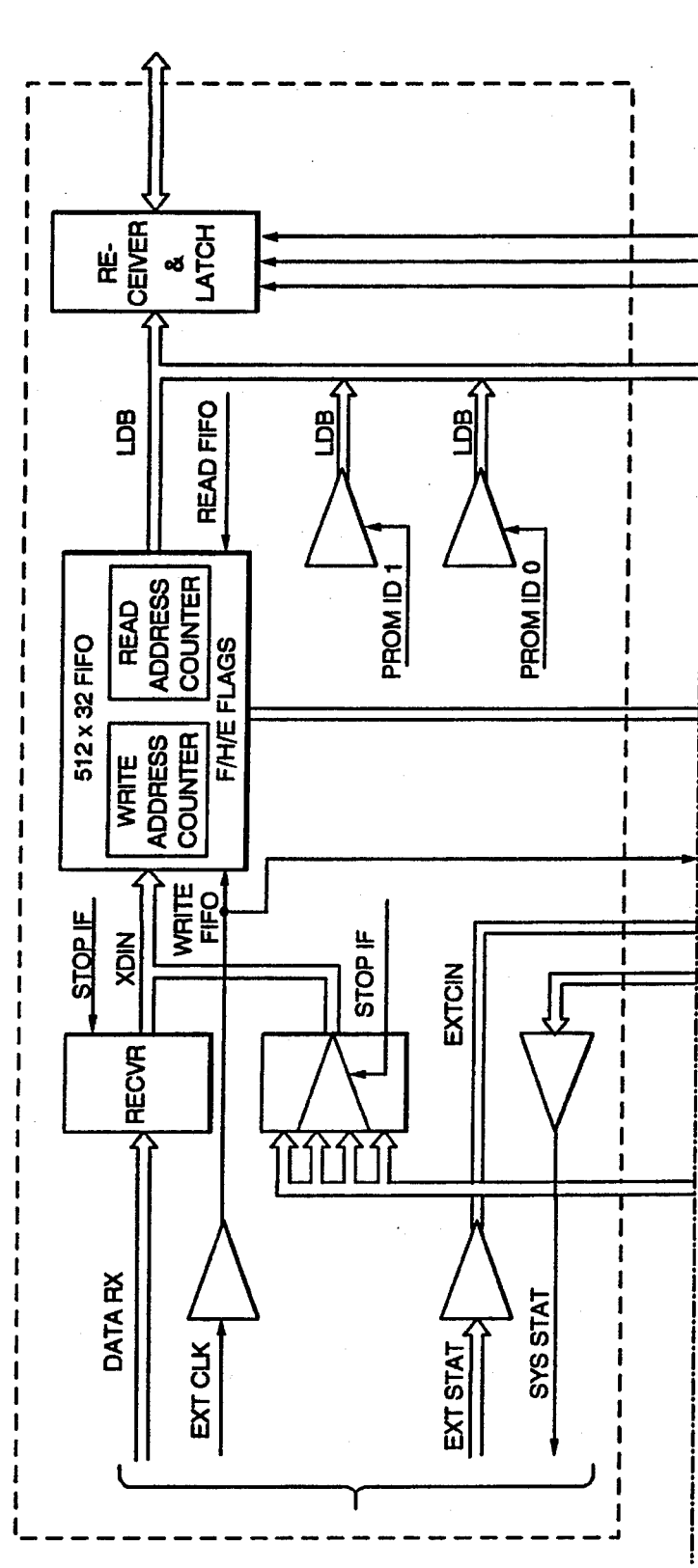

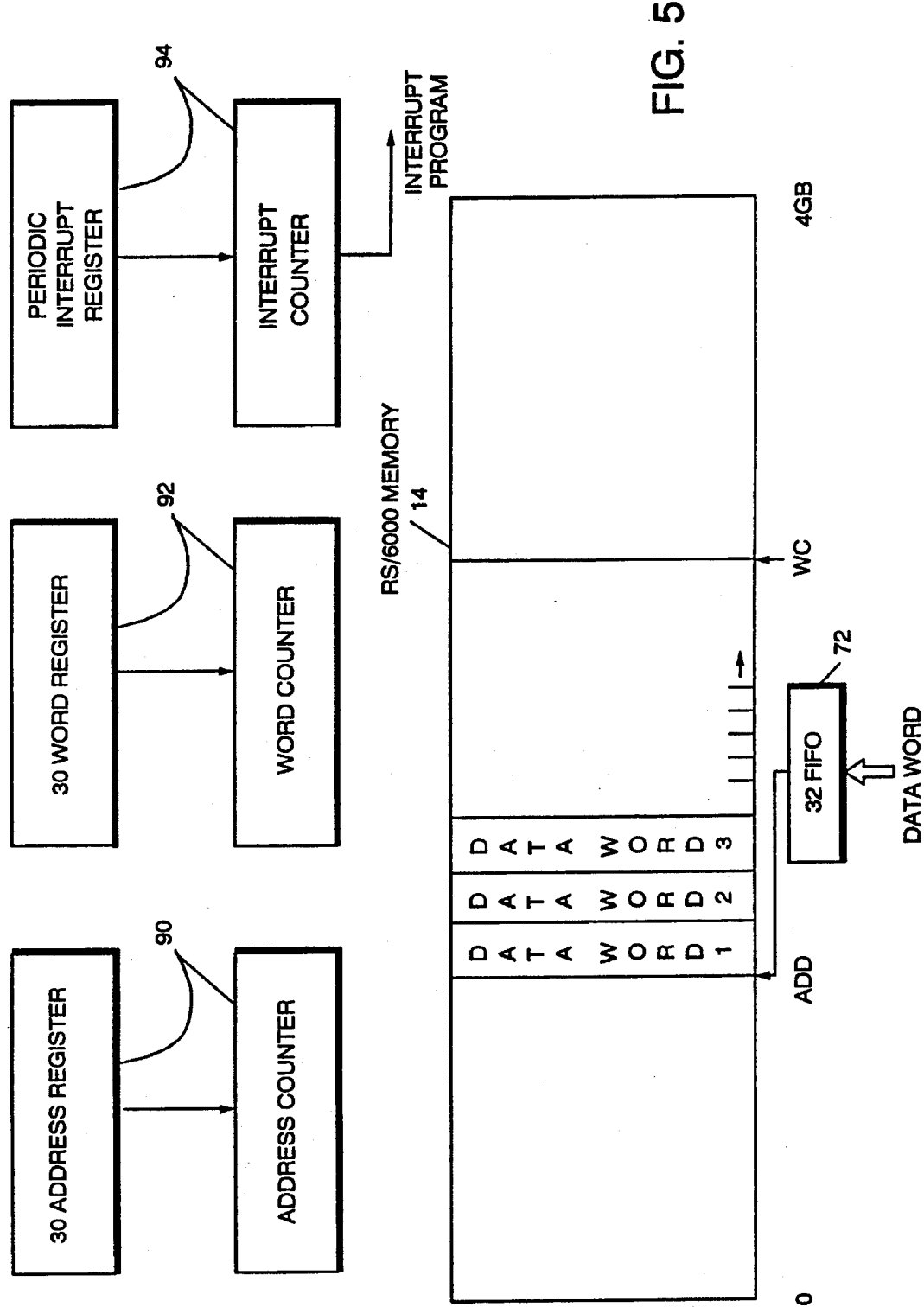

FIELD PROGRAMMABLE GENERAL PURPOSE INTERFACE ADAPTER FOR CONNECTING PERIPHERAL DEVICES WITHIN A COMPUTER SYSTEM

The government has certain rights to this invention as noted in United States government contract number MDA904-91-C-5233, awarded by the Maryland Procurement Office.

This application is a Continuation of U.S. Ser. No. 08/055,054, filed Apr. 28, 1993, by R. Ploger, III, entitled "Field Programmable General Purpose Interface Adapter For Connecting Peripheral Devices Within A Computer System", assigned to the same assignee as this application, now abandoned.

BACKGROUND OF THE INVENTION

The invention is related to an interface adapter card for interfacing between a peripheral device in a communications bus within a data processing system. More particularly, the invention is a field programmable general purpose interface adapter for connecting peripheral devices within a computer processing system.

Computer designers and manufacturers typically organize the systems they produce into elements that permit optimum efficiency in design, manufacture, and capability for adaptation to future growth and expansion. This demonstrates itself in the distinct physical separation of the computation element from the storage elements and the input/output elements within a computer system. This is true for all sizes of systems; physical elements sizes range ,from separate boxes for large systems to chips in small systems such as personal computers.

Shown in FIG. 1 is a typical computer system 10 including a central processor 12, and memory 14 connected to a system I/O bus 20. Connected to the I/O bus are peripheral devices 30, 50 and 60. The variety of input/output capability needed by computers systems includes external memory 30, data archival communications 50 and display 60 which necessitates specific controllers to suit such various peripheral devices. The unique controllers associated with respective peripheral devices then typically have an adaption component (an adapter) that connects the unique character of the controlled peripheral device to a standard or uniformed interface compatible with the internal architecture of the overall computing system. In each case, both the controller and adapter are unique; each require a separate design and fabrication effort to produce.

That effort is expensive and time consuming. It entails designing the logical function of the adapter and controller, translating that design into physical circuits that implement the desired role and laying out traces on circuit cards that can then serve as a reproducible base for those circuits interconnecting the circuits properly so as to provide the desired function. As function changes so does the physical design of the card thereby warranting a repeat of the entire process and the manufacture of another physically new card.

Additionally, errors in design are often discovered after the product has been shipped to customers and is deployed in an operational environment. Correcting such errors is very expensive and the overall system is usually impacted while the service is performed and the logistics of managing such changes calls for careful attention by both the supplier and the customer.

Until the availability of microcontroller and microprocessors this was the only way to change adapter function or to apply engineering changes to the design. Recent developments implementing some portions of the adapter's function in the execution of a stored program allows changing function by changing the program rather than modifying the hardware itself. The greater the extent of function contained in that program, the greater the flexibility in determining the adapter's function via programming. This results in great flexibility but with a cost. The function must be derived from serial execution of program steps rather than from parallel hardware circuit elements capable of concurrent and relatively much faster functioning. As the need for greater performance for the same cost increases, other alternatives for flexibly implementing an adapter design are called for.

SUMMARY OF THE INVENTION

The present invention provides a means of defining and modifying a substantial portion of the function of an adapter interface without modifying the hardware itself or basing the interface card design on a stored program microcontroller or microprocessor. The invention makes use of Field Programmable Gate Array (FPGA) in which a logic function can be effectively wired or interconnected by using a bit pattern presented to the array through a built-in programming port on the array chip. Once programmed, the array operates as if it were composed of discrete hardware logic elements, much as a printed circuit card composed of integrated circuits would with gates and other elements tied together according to the dictates of the adapter's requirements and an engineer's skill.

The arrangement within the FPGA can be changed by changing the defining bit pattern presented at its programming port. In this way, any elements that define the adapters card's function and that are contained in the FPGA can be changed, thereby allowing change in the function of the adapter card as a whole through the presentation of a different bit pattern. This bit pattern is presented to the array over the adapter's interface to the system of which it is a part. Thus, the function of the adapter can change as directed by data delivered to the array over the system's internal I/O interface. This obviates the need for hardware change to the adapter when changing its function, but still makes use of random hardware circuits elements in the array, avoiding the performance limitations imposed by microcontrollers or microprocessors.

BRIEF DESCRIPTION OF THE DRAWINGS

The objects, features and advantages of the present invention will be more fully understood with reference to the description of the preferred embodiment and the drawings wherein

FIG. 3, comprising FIGS. 3A and 3B, is a listing of the pin connections for the adapter interface card of the present invention.

FIG. 4, comprising FIGS. 4A, 4B, 4C and 4D, is a schematic diagram of the control section of the adapter card of the present invention.

FIG. 5 is a block diagram of the circular buffer implemented by use of the present invention.

DESCRIPTION OF THE PREFERRED EMBODIMENT

Figure 1:
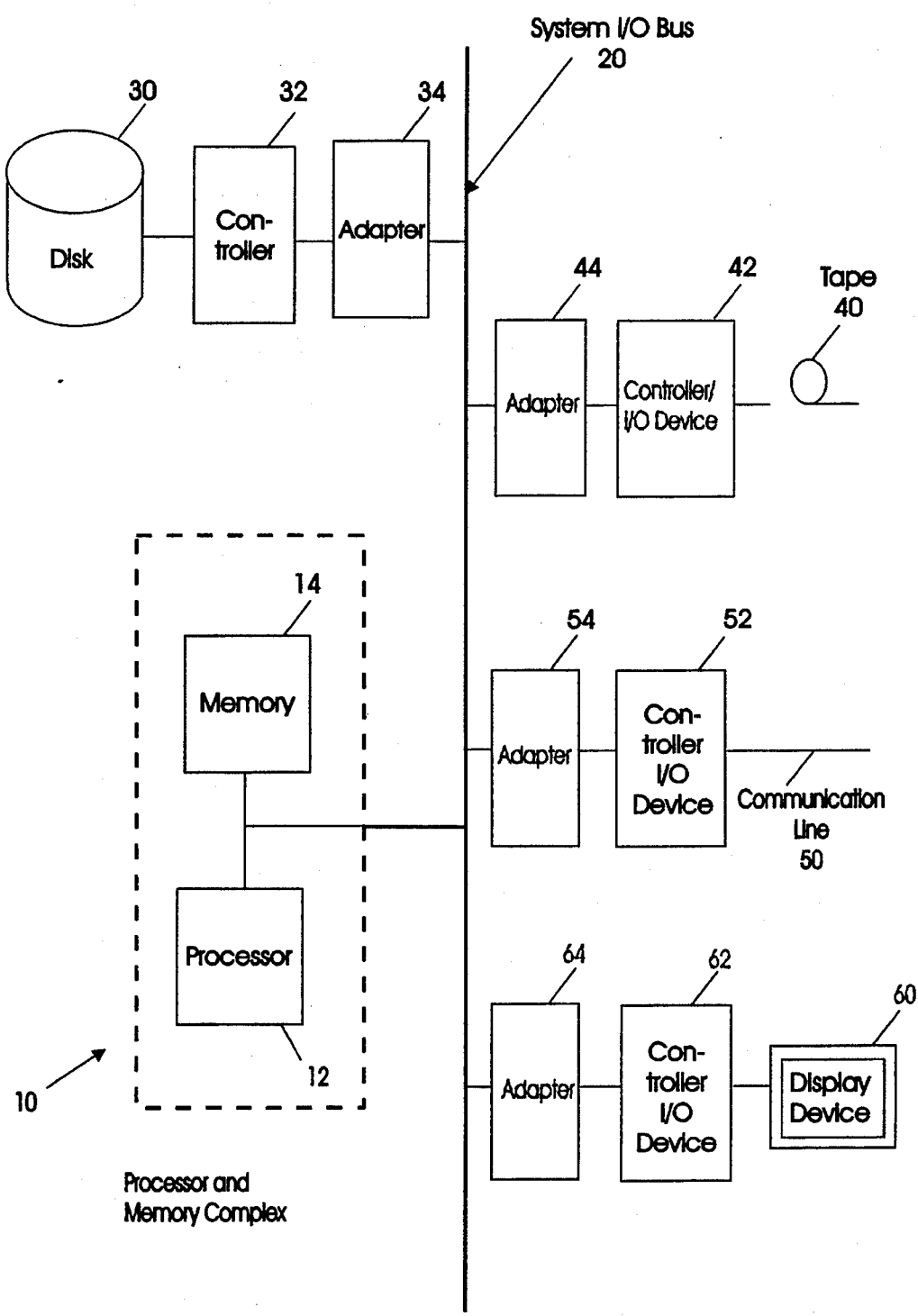
FIG. 1 is a system diagram of a typical computer data processing system.
Figure 2:
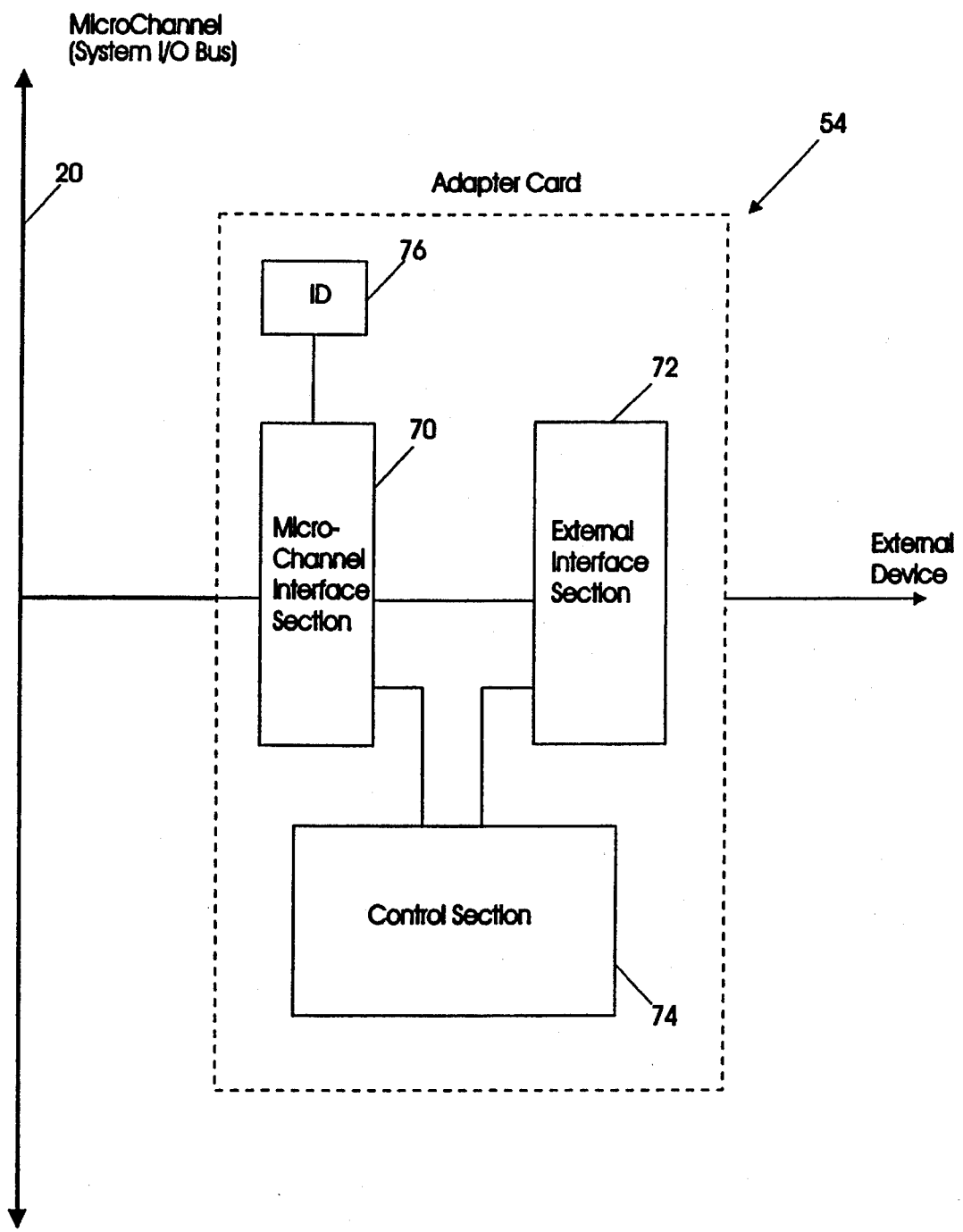
FIG. 2 is a block diagram of the adapter interface of the present invention.

The invention is implemented as a parallel data receiver adapter card that operates on a Micro Channel bus. The particular implementation of the invention is called a High-Speed Data Streaming Receiver in that it uses the data streaming feature of the Micro Channel to receive data into system memory. The adapter interface has three major sections as shown in FIG. 2, Micro Channel interface 70, external device interface 72, and control logic section 74. These three sections cooperate as shown in FIG. 2 to provide the adapter interface such as adapter interface 54 for the communications line 50 to the system I/O bus 20 so that communications can be processed or stored in memory by the computing system.

The Micro Channel is a parallel bus architecture to support up to eight I/O adapter cards. The bus contains 32 bits of data (plus parity), 32 bits of address and assorted control lines to support the selection of adapters on the multiplexed bus and to control data transfers and interrupts. Data may flow from or to adapters under either program control (one data item at a time) or directed memory access control (a block of data at a time). Adapters are also generally capable of generating interrupts. The Micro Channel is unusual in that the system manager may geographically select by slot number other bus attached adapter cards. Further, it is architectured such that adapter cards on the Micro Channel must respond with unique identification number shown as 76 when selected by slot number. This allows automatic discovery of the complement of adapter cards including what position 1–8 each card is plugged into.

The Micro Channel interface section on the adapter card contains logic necessary to electrically satisfy the interface requirements of the Micro Channel and to correctly respond to the rudimentary commands it may receive over the geographic selection mechanism, including supplying the adapter's unique ID when queried. It also supports responding similarly when queried using conventional, bus addressed means. This section is a necessary part of any properly designed Micro Channel adapter. The workings of the Micro Channel are described in a publication titled "Micro Channel Architecture Specification" available from International Business Machines Corporation, the teachings of which are hereby incorporated by reference.

The external interface section 72 contains circuitry that allows connection to an external device which may be remote to the system and to which the adapter is attached. Such circuitry includes electrical conditioning circuits and speed matching devices to buffer the data flow. The external interface section is 32 bits wide and receives a word off the interface when signalled by the external device/controller. The data path ties directly from the external interface section to the Micro Channel interface section, providing a path for that data from its source in the external device to its destination in system memory, via direct memory access operations over the Micro Channel.

The control logic section 74 provides all the logic necessary to control the correct operation of the adapter in its operational (as opposed to setup) mode. It is physically composed of an FPGA, connected so as to receive its programming bit patterns over the rudimentary Micro Channel interface section.

The FPGA has between 5,000 and 10,000 gates, each of which can be wired to other gates within the FPGA and to external pins, according to the programming bit pattern presented to it. The size of the file containing the bit pattern is slightly under 12,000 bytes, and it is stored on the hosting system's disk where it persists across system power cycles. When the system is powered on or when the system manager wishes to redefine the adapter the system verifies the adapter card type by reading its unique ID, 76, and then as part of the system initialization fetches the FPGA bit pattern from disk and presents it to the FPGA over the Micro Channel using the rudimentary Micro Channel interface section, 70, built into the adapter interface card.

Until this is done the adapter interface card cannot perform its intended function nor for that matter any useful function other than the rudimentary Micro Channel responses. Once the downloading is done the card can now: manage the presentation of interrupts to the system; manage the operation of DMA transfers; manage the speed matching devices in the external interface; control and sense signaling on the external interface; accept commands from the controlling program; and reflect adapter and interface status to the program.

The logic defined by the downloading of the stored programming bit pattern into this adapter includes an address register and counter for addressing system memory under DMA; a word counter and register for keeping track of the size of the DMA transfers; an interrupt counter and register for knowing when to present interrupts; a control register containing flags that start, stop or otherwise manage data flow during DMA; and a status register that reflects the important conditions internal to the adapter and existing on the external interface. In addition, other gates are interconnected to provide clock synchronization and perform other "glue" functions necessary in interfacing adapter units.

Functionally, the high-speed data streaming (HSDS-R) interface adapter card is used to receive data from an external device in the system memory via the Micro Channel. The card is a 32-bit bus master card on the Micro Channel and offers a 32-bit differential interface to the external device. It can operate either in a PS/2 or RISC System/6000 computer system. It accepts data from an external device one 32-bit word at a time, under control of a clocking signal provided by the external device, writing each word sequentially into a first-in first-out (FIFO) buffer on the card. The data is then passed into system memory in a burst, utilizing the high-efficiency data streaming transfer mechanism available on the Micro Channel. The card is a bus master and as such contains not only data buffering in the form of the 512-word FIFO but address and word counters to manage DMA transfers from the FIFO into the hosting system's memory. Data words are stored into consecutive locations in system memory, starting at an initial location defined by the controlling program. The size of the memory buffer available to the card is also defined initially, so that the card knows when the buffer's upper limit has been reached. At that point, the card can continue to receive additional data words, but starting over at the initial address. Data can be received this way repetitively and without any end, using the system memory's buffer as a circular buffer which is being constantly refreshed with newly-arriving data words. The controlling program must dispose of "old" data before it is overwritten in order to avoid its loss. Alternatively, the external device can assert an end of transmission indication, causing the cessation of data reception, draining of the on-card FIFO, and presentation of a concluding interrupt to the controlling program. The card can periodically interrupt the system during data reception, at a rate determined by a constant set by the controlling program. This interrupt can be used by the program to identify where in system memory data has been recently stored, thus allowing near-real-time processing of the data by the program. The rate at which this interrupt occurs can be set by the controlling program to assure its synchronization with incoming data. In the case of continuous receipt of data, the card can be viewed as a writer of the data in memory, constantly sweeping over the defined buffer with newly arriving data, while the program, being driven by the periodic interrupt, follows behind the newly arriving data, analyzing and disposing of it before it is overwritten by the next sweep of the card. Data may arrive at up to 6.25 million words per second (25 million bytes per second); the system and controlling program must be capable of handling and disposing of data at this rate in order to avoid its loss. The card does have a flow control line on the external interface which the external device should use if the data rate would otherwise exceed that supportable by the receiving system. No hardware indication is available if the program falls behind and loses data, but if the Micro Channel or hardware bandwidth anywhere else between the card and system memory constrains flow, the card has detection logic to indicate an overrun condition to the program the next time it reads the card's status (presumably at the next periodic interrupt).

Details of the External Interface

The HSDS-R card has two card-edge connectors, 80 and 82 in FIG. 3, on its top, each of 50 pins, arranged to permit easy connection to an adjacent card within the same system unit. The connector tabs are keyed to prevent mis-plugging or crossing the two flat cables that carry the external signals. Each connector carries 25 differential signals, with the plus half of each signal being on the odd, component-side pin and the matching negative half on the opposite, even pin. The data bit number is as perceived by an RS/6000 program. Thus, Data 0 will appear in the left most bit position of a word, Data 8 will appear in the left most bit position of the next higher byte, and Data 31 is the right-most bit in the word, the right-most bit of the 4th byte. This follows the "big-endian" convention. (If installed in a PS/2, Data 0 will NOT appear in the bit 0 position of the PS/2 word because the PS/2 (and Micro Channel) are little-endian.)

Receivers and Drivers

The card receives the 32 data signals and 4 control signals using 75ALS195 differential receivers, with a 100 ohm resistor across each signal pair at the receiver terminals for impedance matching. It drives 4 control signals using a 75ALS194 differential driver. There are no termination resistors for the drivers; these should be provided at the receivers in the external device. Ten pins on each of the two connectors are reserved for ground. These are used to assure good signal-to-noise and good common-mode conditions.

Logical Meaning of Signals

The descriptions below assume proper voltage levels for the interface and speak to the logical, rather than electrical, characteristics of the interface. For electrical characteristics, refer to manufacturers' literature on the above-mentioned receivers and drivers.

Data 0–31: If the plus side of the differential pair is more positive that the minus side, the corresponding bit position will be a binary 1. If more negative, it will be a zero.

Ext Clock: Data 0–31 is registered by the card when this signal transitions from false to true. It, like the Data 0–31 signals, is driven by the external device. The signal is true when the plus side of the pair is more positive than the negative side. (This applies for all control signals on the interface.) Data must be stable and valid at the rise of Clock and remain valid for 150 ns after that rise. The clock must be stable for at least 40 ns in each state, and cannot have less than 160 ns between consecutive rises. The card develops a synchronized version of the Clock signal for the registering of the external data, causing the actual sampling of data to occur at some arbitrary time after the rise of the Clock signal, but within the specified 150 ns hold time interval.

Terminate: Driven by the external device, this signal causes cessation of reception of data by the card, which will then flush any data still in its buffers and interrupt the controlling program, indicating that reception activity has ceased. It is edge-detected by the card and has no timing relationship with any other signal on the external interface. This signal unconditionally resets the Start/Run bit in the Control Register.

External Status 2,3: These status lines from the external device appear as bits in the Status Register. They can be used as a signalling channel from the external device to the controlling program. Both lines are sampled into the Status Register by the card's 20 Mhz clock; the bit read represents the line's state as of the last clock transition.

Flow Control: The card drives this signal to the external device to indicate that its FIFO buffer is half full. The buffer is 512 words deep, so this line is raised and remains true as long as there are more than 256 words in the FIFO. This signal is made available to allow those devices which are capable of it to control data flow so as to avoid overruns.

System Status 1–3: These signals from the card to the external device have no significance to the card other than as bits in the Control Register. They may be used as a signalling channel from the controlling program to the external device.

Programming Model

The HSDS-R card is controlled through the setting and resetting of values in internal registers:

Address Register/Counter
Word Register/Counter
Periodic Interrupt Register/Counter
Control Register
Status Register
Configuration Register
Test Data Register
POS Registers 0–5.

The PROGRAMMABLE OPTION SELECT (POS) REGISTERS are a requirement of Micro Channel architecture and are used to supplant the older switch-setting requirements of adapters on the ISA (AT) bus. They are found at 70 and 76 in FIG. 2. POS 0 and 1 together comprise the card ID, unique to adapter type, and reside in 76 on FIG. 2. Micro Channel being little-endian, POS 0 is the lesser and POS 1 the more significant byte of the 16-bit ID field, x'8FFE':

POS 0: 8 bits, accessible as a byte only. Read only, containing the value x'FE'.

POS 1: 8 bits, accessible as a byte only. Read only, containing the value x'8F'.

POS 2: 8 bits, read/write as a byte.

bit 0: Ignore, always write to a 1.

bit 1: Ignore, always write to a 0.

bit 2: Ignore, always write to a 1.

bit 3: Ignore, always write to a 0.

bit 4: Enable interrupts.

bits 5, 6: Encoded interrupt level.

bit 7: Card enable.

POS 3: 8 bits, read/write as a byte.

bits 0,1,2,3: Encoded base I/O address.

bit 4: Not used, 0.

bit 5: Not used, 0.

bit 6: Remove resets.

bit 7: Load/Run gate array.

POS 4: 8 bits, read/write as a byte. No read significance.

bit 0: Always write to a 1.

bit 1: Always write to a 1.

bit 2: Always write to a 0.

bit 3: Always write to a 0.

bit 4: Always write to a 0.

bit 5: Always write to a 0.

bit 6: Always write to a 1.

bit 7: Always write to a 1.

POS 5: 8 bits, read/write as a byte.

bit 0: Channel Check indicator; write a 1 to reset.

bit 1: Enable Channel Check; always write to a 1.

bit 2: Data Streaming Enable. Normally should be set on.

bit 3: Fairness Enable. Normally should be set on.

bits 4–7: Encodes the arbitration level.

These POS registers are accessible using the Card Select mechanism, where the card is selected by its physical location rather than address. The 3 low-order address bits then determine which POS register on the card is being selected. They are also accessible in the I/O space of the Micro Channel once the card has been enabled (POS 2 bit 7) and the base I/O address set (POS 3 bits 0–3). In this case the register is selected by adding the POS register number to the base address. Thus if a base of x'0400' is set, POS 5 is accessible at byte location x'0405' in I/O space.

The CONFIGURATION REGISTER is also a byte-wide register, but is accessible only as an I/O register displaced x'000F' off the base address.

bit 0: Ignore; always write to 0.

bit 1: Channel Check status; write to 1 to reset.

bits 2–4: Ignore; always write to 0.

bit 5: Interrupt Indicator; write to 1 to reset.

bit 6: CDSFDBK error; write to 1 to reset.

bit 7: Forced off bus; write to 1 to reset.

The TEST DATA REGISTER is a byte register that can be written at base I/O address+x'00B0'. During adapter initialization, this register is the conduit through which the binary data pattern defining the internal gate array wiring is passed, byte sequentially. Once initialized, this register contains the source of test data used when the card is operated in Test Mode.

TRANSFER CONTROL REGISTERS

The following registers do not exist until the programmable gate array has been loaded. Once loaded, they have the following definition:

ADDRESS REGISTER/COUNTER 32 bits long. The Register is write-only, at displacement x'0010'. The Counter is read-only, at displacement x'0008'. The two least significant bits are zero. The Register is loaded with the starting system memory address by the controlling program as part of starting the data reception process. The Counter is then loaded with that value when the Start bit in the Control Register is set on and increments by 4 with each word transferred. When the Word Counter decrements to zero (see below) the Counter is reloaded from the Register with the initial starting address and data transfer continues. The size and organization of this counter/register dictates that data may be stored anywhere in 4 gigabyte system memory address space on word (4-byte) boundaries. Note that in the RS/6000, the system memory address the card presents to the Micro Channel during DMA is in fact artificial in that the channel controller maps that value to the real system memory address. Although artificial, there can be no address conflict (overlap) between users of Micro Channel DMA channels regarding this artificial address space. Thus, in practice, the address and word count will be restricted by these constraints. The Address Counter always points one word beyond where the next data word will be written. For example, if the Address Register were set to x'05000000', the value read from the Address Counter after the Start bit is set but before any words are transferred will be x'05000004'. After the first word is transferred, the new counter value will become x'05000008'. During data reception, the program can infer where in the system memory the card is currently storing data by reading the Address Counter.

WORD COUNT REGISTER/COUNTER 32 bits long. The Register is write-only, at displacement x'0030'. The Counter is read-only, at displacement x'0028'. The 8 least significant bits are zero. The Counter is loaded with the initial Word Count value as set in the Register when the Start bit in the Control Register is set on. It then decrements by 256 every time 64 words are transferred, until it reaches zero. At that time it is reloaded with the contents of the Register, the Address Counter is similarly reinitialized from its register, and data reception continues at the original starting address. The size and organization of this register/counter dictates that the system memory buffer can be any size up to 4 gigabytes, modulo 256 bytes, within constraints mentioned above. Because the counter is zeros in its low 8 bits, it in fact is a 256-byte block counter.

PERIODIC INTERRUPT REGISTER/COUNTER 32 bits long. The Register is write-only, at displacement x'0050'. The Counter is read-only, at displacement x'0048'. The 8 most significant and 8 least significant bits are zero. The Counter is loaded with the Register contents at startup, and then decrements by 256 every 64 words transferred. When it decrements to zero, an Interrupt is given to the controlling program and the Counter is once again automatically initialized; data reception continues during this time. The organization of the register/counter dictates that a periodic interrupt can occur no less frequently than every 16 megabytes and no more frequently than every 256 bytes.

CONTROL REGISTER 32 bits long. Accessible for reading at displacement x'0068' and for writing at displacement x'0070'. Bits 0, 8–12, and 16 through 31 have no meaning and should be set to zero.

| Weight: | Position: | Name: |
| --- | --- | --- |
| x'40 00 00 00' | bit 1: | Write FIFO Once. |
| x'20 00 00 00' | bit 2: | Auto-increment Test Data Byte. |
| x'10 00 00 00' | bit 3: | Suppress Micro Channel Transfers. |
| x'08 00 00 00' | bit 4: | Write FIFO Continuously. |
| x'04 00 00 00' | bit 5: | Operational (not Test) Mode. |
| x'02 00 00 00' | bit 6: | Pause/Drain FIFO. |
| x'01 00 00 00' | bit 7: | Start/Run. |
| x'00 04 00 00' | bit 13: | System Status Bit 3. |
| x'00 02 00 00' | bit 14: | System Status Bit 2. |
| x'00 01 00 00' | bit 15: | System Status Bit 1. |

This register is the control point for operational data movement, through the setting and resetting of specific control bits, described in more detail below.

It also allows for exhaustive testing of the card, including data paths and counter operations. The only logic not testable in Test Mode are the differential receivers and drivers. Testing is initiated by resetting the Operational Mode bit, which shuts off all external receivers and instead routes the Test Data Register into the FIFO, thus simulating external data. The one byte of Test data is written to all 4 bytes of the FIFO. (Note that the card comes up in the Test Mode because of the initial zero state of this bit and that this bit must be set to a one during normal operations.) Bits 1 through 4 relate to operations under Test Mode:

Write FIFO Once: Causes the contents of the Test Data Register to be written to the FIFO. The one-byte value is copied to the 4 bytes of the word-wide FIFO. Thus a test data byte of x'12' will cause x'12121212' to be written to the FIFO.

Auto-Increment Test Data: Increments the Test Data Register by one each time a FIFO write occurs while in Test Mode. Since the Test Data byte is written in parallel to the 4 bytes of the data word, each succeeding word will show an increase of x'01010101' over the prior one.

Suppress Micro Channel Transfers: Prevents draining the FIFO into system memory. This permits a test program to load up the FIFO with test data and verify operation of the overrun detection logic. Data queued will be passed into storage when this bit is reset.

Write FIFO Continuously: Writes the contents of the Test Data Register to the FIFO at 2.5 million words per second. If the Auto-increment bit is set, the Test Data Register will increment each time a word is written so that a test program can verify correct reception of data at high rates. If the FIFO overflows during this mode of operation, the Test Data Register nonetheless continues to increment and so the program may detect the existence and amount of lost data words in storage by subtracting sequential locations in the system data buffer; loss of data is represented by a difference of more than x'01010101' between consecutive words in storage. This technique may be used to assess the magnitude of bandwidth limitations in the system being tested so long as not more that 256 words at a time are lost (the modulus of the Test Data Register).

Pause/Drain: Forces immediate draining of the FIFO and subsequent cessation of data reception on the external interface. The Address, Word Count and Interrupt Registers are unaltered and their respective counters freeze at the completion of the FIFO drain. No interrupt is generated. Data reception can be resumed by turning off this bit so long as Start/Run is still set on. If the external source of data continues to present data words to the card while this bit is set, the FIFO will accept those words, but no further transfers into system memory will occur. Overrun can occur in this case and any data presented while overrun is indicated will be lost. Typically this bit should be used only for clean-up at the conclusion of a receive operation, having reset the Start/Run bit first. This function is performed automatically if the external device stopped the operation with the Terminate control line.

NOTE: During data reception the card does not attempt to initiate a transfer from the FIFO to system memory until at least 64 words are in the FIFO, in order to maintain efficiency in the bursting process. Once a burst is initiated, the burst will continue until preempted by another device on the Micro Channel or until the FIFO is empty. If a preemption occurs, and this is possible because other activities on the Micro Channel can be expected frequently, fewer than 64 words can be left in the FIFO indefinitely, until forced out 1) with the arrival of additional data words, which cause the residual count to increase beyond 64, thus triggering a new burst, or 2) the setting of the Pause/Drain Bit in the Control Register, or 3) the signalling of Terminate from the external device.

Start/Run: Loads the Address, Word and Interrupt Counters from their respective Registers and enables data reception logic. If in Test Mode, data will come from the Test Data Register; if in Operational Mode, data will be received from the external device. It is the setting-on of the Start/Run bit that causes initialization of the counters from the values in their respective registers; thus if the programmer wishes to restart data reception with initial conditions, the Start/Run bit must be reset (by writing a zero in that bit position) and then set on again. Setting off the Start/Run bit immediately blocks any further data reception. Overrun will not be indicated in the presence of external device clocking since that signal is ignored when the Start/Run bit is reset. The FIFO may contain residual data, which should be drained using the Pause/Drain bit. No interrupt is generated.

STATUS REGISTER 32 bits long. May be read at displacement x'0088'. Contains individual status bits at the most significant end, Test Data register contents, and FIFO residual count at the least significant end. Other bits are unused and should be ignored.

| Weight: | Position: | Name: |
| --- | --- | --- |
| x'80 00 00 00' | bit 0: | Ready for array download. |
| x'10 00 00 00' | bit 3: | External Status 3. |
| x'08 00 00 00' | bit 4: | External Status 2. |
| x'04 00 00 00' | bit 5: | External Termination Signalled. |
| x'02 00 00 00' | bit 6: | FIFO empty. |
| x'01 00 00 00' | bit 7: | Overrun. |

Bit 0 is only of significance during the gate array downloading process at system boot time and is off once the card is operational.

Bits 3 and 4 are direct representations of the external lines with those names. Bit 5 edge-detects the onset of the Terminate line on the external interface. It is reset when the Start/Run bit is turned on in the Control register. Bit 6 is on if the FIFO is empty and off if otherwise. Bit 7 sets when an attempt is made to clock a new data word into the FIFO when it is full. It is reset by virtue of reading the Status register. Attempts to write new data words to a persistingly full FIFO will not cause the bit to re-set on; the FIFO must first become non-full and then re-fill before writing a new word will cause this indication to be presented again.

| | |
| --- | --- |
| x'00 tt 00 00' bits 8–15: | Test Data Register (read only). |
| x'00 00 0n nn' bits 22–31: | FIFO Residual Count (0 - x'1ff'). Bit 22 = FIFO Full indicator (x'200'). |

A counter is used to accumulate the FIFO residual count: it increments when a data word is written to the FIFO and decrements when a data word is read from the FIFO. The counter has nine bit positions and is represented in the 9 rightmost bits of the Status Register. The next more significant bit (Bit 22) is not an extension of that counter but is a direct reflection of the Full line coming out of the FIFO itself. As the 512th word is written into the FIFO without any intervening reads, this bit will set on and the nine counter positions will reset. The 513th write to the FIFO will cause the setting of the Overrun bit.

Figure 4B:
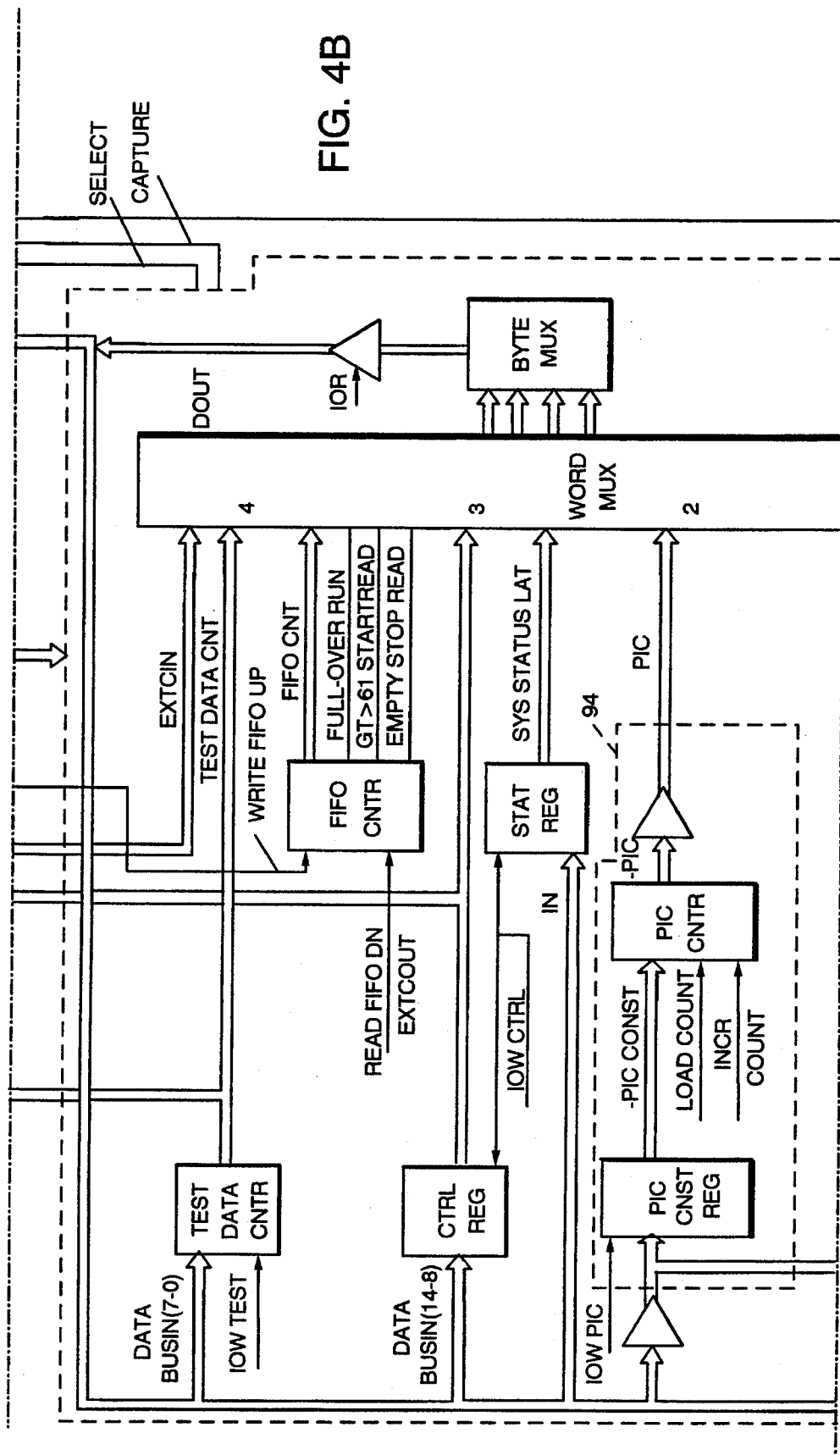
Figure 4C:
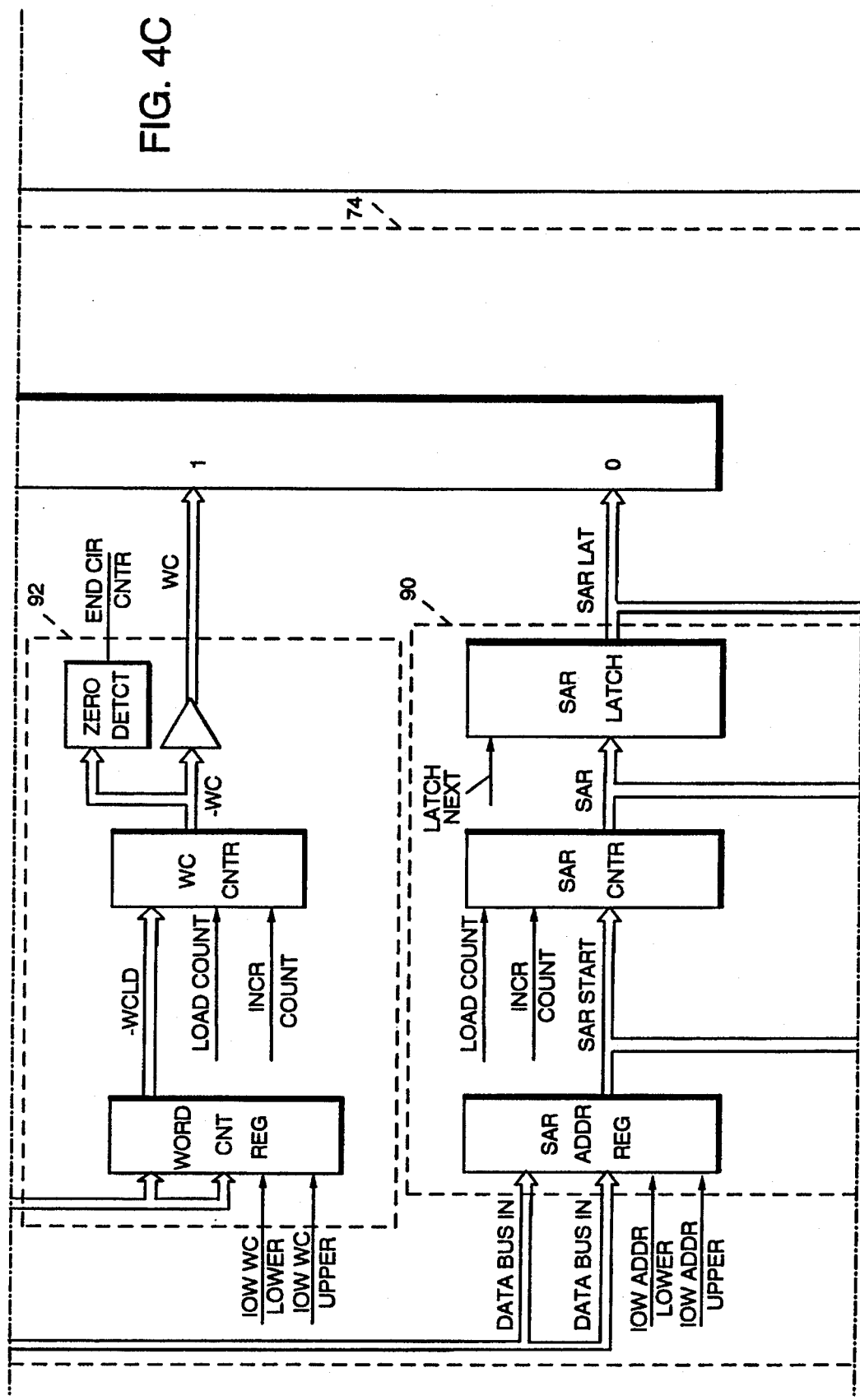
Figure 4D:
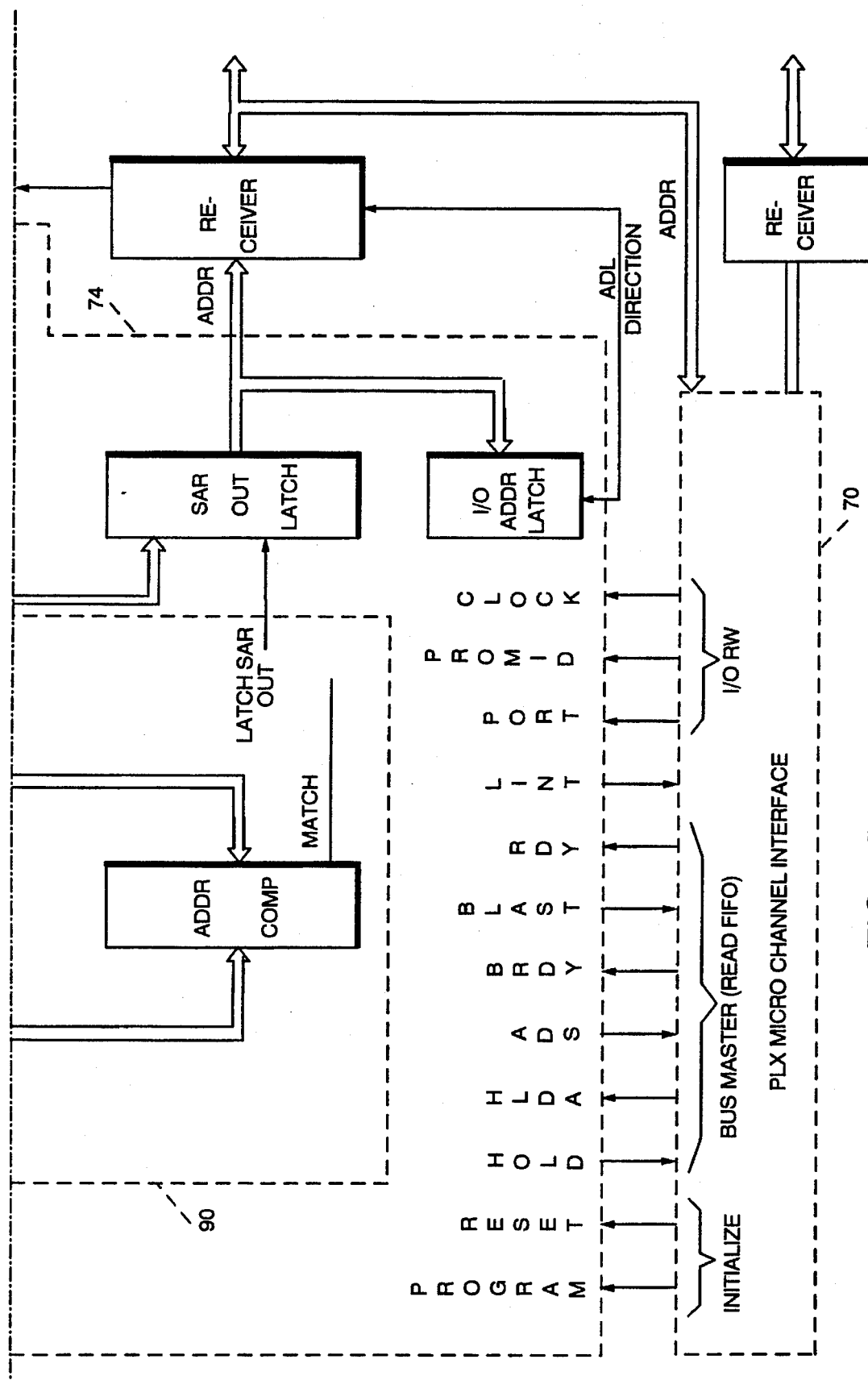

FIG. 4 shows in schematic form the layout of the High Speed Data Stream - Receiver employing the present invention. The Micro Channel interface 70 communicates to a Field Programmable Gate Array such as a Xilinx XC4005. The FPGA forms the control section of the adapter interface 74. The external device section is formed by the FIFO and transceiver 72. In operation the processor memory receives data from the external device 72 and inputs this at an address defined by Storage Address Counter (SAR CNTR) 90. At the same time the Word Counter (WC CNTR) 92 and Periodic Interrupt Counter (PIC CNTR) 94 are decremented. This is graphically illustrated in FIG. 5. The registers and counters are loosely defined by the gate array areas in FIG. 4.

What has been shown is a high speed data streaming interface adapter intended for receiving information. Likewise, a high speed data streaming card to transmit information can also be implemented using the present invention. The novelty of the present invention lies in an ability to download its control logic rather than have it imbedded either in physical wiring or in read only memory. This permits the dynamic definition of the card's functioning characteristics within constraints imposed by the physical design via programming. The full functionality of card is established when the card is powered up and loaded rather than when the card is manufactured. As a result, the interface adapter can be modified to changing applications without redesigning its physical characteristics. Further, engineering changes to correct errors found in actual use can be applied to substitution of a software file rather than physically reworking or replacing the interface adapter.

While the invention has been shown with reference to a preferred embodiment, it would be obvious to one skilled in the art that the invention can be employed for defining various interface adapters for performing various applications without departing from the spirit and scope of the invention.

What is claimed is:

1. An interface adapter in a computer system coupled between a communication bus and an external peripheral device for control purposes, the system including a memory for storing unique bit patterns definitive of a data transfer characteristic of each external peripheral device, said interface adapter comprising:

a bus interface unit for receiving and transmitting data on said communication bus, said bus interface unit containing a physical identification number for identifying said bus interface unit on said communication bus;

an external peripheral device interface for communicating with said peripheral device and coupled to said bus interface unit; and a control section for receiving through said bus interface unit the unique bit patterns from said memory to set up the control section for adaptively interfacing between said computer system and said peripheral device, the control section comprising a field programmable gate array of independent logical elements which is dynamically programmed by said unique bit patterns transmitted from said memory for defining or redefining the logical elements into functional logic units in accordance with each unique data transfer characteristics of the peripheral device, said control section controlling the communications between said communication bus and said external peripheral device.

2. The interface adapter of claim 1 wherein the bus interface unit is coupled to a Micro Channel architecture bus.

3. The interface adapter of claim 1 wherein the adapter contains a first in first out buffer connected between input and output terminals of the external peripheral device interface.

4. The adapter of claim 1 wherein the field programmable gate array comprises:

a plurality of logic devices coupled between input and output terminals of the array, the logic devices being definable into functional logic units for handling the transfer of data between the peripheral device and the communication bus in accordance with the bit pattern presented to the input terminals for the unique data transfer characteristics of the peripheral device.

5. The adapter of claim 4 wherein the logic devices are definable into an address register and counter for addressing a system memory coupled to the communication bus for direct memory access.

6. The adapter of claim 5 wherein the logic devices are further definable into a word counter and register for tracking the size of the direct memory access transfers.

7. The adapter of claim 6 wherein the logic devices are further definable into an interrupt counter and register for providing interrupt signals to the communication bus when a data transfer is completed,.

8. The adapter of claim 7 wherein the logic devices are further definable into a control register for managing data flow during direct memory access through the setting and resetting of selected control bits placed in the register.

9. The adapter of claim 8 wherein the logic devices are further definable into a status register that reflects significant conditions on the peripheral device and bus interface unit.

10. An adapter in a computer system including a memory for storing bit patterns, the adapter coupling a peripheral device to a communication bus for transferring data therebetween comprising:

a) a bus interface unit coupled to the communication bus;

b) a peripheral interface unit coupled to the bus interface unit and the peripheral device; and c) a programmable control device containing independent logical elements coupled to the bus interface unit and the peripheral interface unit for controlling the transfer of data between the communication bus and the peripheral device, the programmable control device receiving the bit patterns over the communication bus for dynamically defining or redefining the logical elements into functional logic units for operation of the control function in accordance with each unique data transfer characteristic of the peripheral device.

11. The adapter of claim 10 wherein the programmable control device is a field programmable gate array.

12. In a data processing system including a plurality of peripheral devices, a processor, a memory storing bit patterns, each bit pattern definitive of the unique data transfer characteristics of an external device, a communication bus, and an adapter coupled between at least one peripheral device and the communication bus, the adapter comprising:

a) a bus interface unit coupled to the communication bus;

b) a peripheral interface unit coupled to the bus interface unit and the peripheral device; and c) a programmable control device containing independent logic devices coupled to the bus interface unit and the peripheral interface unit for controlling the transfer of data between the communication bus and the peripheral device, the programmable control device receiving bit patterns over the communication bus, the programmable control device receiving the bit patterns from the memory for dynamically defining or redefining the logic devices into functional logic units for operation of the control function in accordance with each unique data transfer characteristics of the peripheral device.

13. The adapter of claim 12 wherein the programmable control device is a field programmable gate array comprising:

a plurality of logic devices coupled between input and output terminals of the array, the logic devices being definable into registers for handling the transfer of data between the peripheral device and the communication bus in accordance with the bit pattern presented to the input terminals for the unique data transfer characteristics of the peripheral device.

14. In a data processing system including a plurality of peripheral devices, a processor, a memory, a communication bus, and an adapter coupled between at least one peripheral device and the communication bus, the adapter managing the transfer of data between the system and peripheral device, a method for changing the logical operation of the adapter in accordance with each data transfer characteristic of the peripheral device comprising the steps of:

a) storing in the memory a file containing bit patterns for programming the logical operation of the adapter in accordance with the data transfer characteristics for each peripheral device connected to the system;
 b) initiating system operation;
 c) fetching from the memory a unique bit pattern for the adapter; and
 d) transmitting the unique bit pattern to the adapter over the communication bus for defining the logic elements into functional logic units for operation of the adapter in accordance with the unique data transfer characteristic of the peripheral device to which it is coupled.

15. The method of claim 14 further comprising the step of:

a) transmitting a revised bit pattern to change the logical operation of or to correct design errors in the adapter.

16. An adapter in a computer system including a memory for storing bit patterns, the adapter coupling a peripheral device to a communication bus for transferring data therebetween comprising:

a) a bus interface unit coupled to the communication bus;
 b) a peripheral interface unit coupled to the bus interface unit and the peripheral device; and
 c) a programmable control device containing independent logical elements coupled to the bus interface unit and the peripheral interface unit for controlling the transfer of data between the communication bus and the peripheral device, the programmable control device receiving the bit patterns over the communication bus for dynamically defining or redefining the logical elements into functional logic units for operation of the control function in accordance with each unique data transfer characteristic of the peripheral device wherein the functional logic units include an address register and counter for addressing the memory coupled to the communication bus for direct memory access; a word counter and register for tracking the size of the direct memory access transfers; an interrupt counter and register for providing interrupt signals to the communication bus when a data transfer is completed; a control register for managing data flow during direct memory access through the setting and resetting of selected control bits placed in the register; a status register that reflects significant conditions on the peripheral device and bus interface unit.

17. In a data processing system including a plurality of peripheral devices, a processor, a memory, a communication bus, and an adapter coupled between at least one peripheral device and the communication bus, the adapter managing the transfer of data between the system and peripheral device, a method for changing the logical operation of the adapter in accordance with each data transfer characteristic of the peripheral device comprising the steps of:

a) storing in the memory a file containing bit patterns for programming the logical operation of the adapter in accordance with the data transfer characteristics for each peripheral device connected to the system;
 b) initiating system operation;
 c) fetching from the memory a unique bit pattern for the adapter; and
 d) transmitting the unique bit pattern to the adapter over the communication bus for dynamically defining the logic elements into functional logic units for operation of the adapter in accordance with the unique data transfer characteristic of the peripheral device to which it is coupled or transmitting a revised bit pattern to change the logical operation of or to correct design errors in the adapter.

* * * * *